Patented May 1, 1951

2,550,985

UNITED STATES PATENT OFFICE 2,550,985

METHOD FOR PRODUCING DIBORANE

Albert E. Finholt, Beverly, Mass., assignor to Metal Hydrides Incorporated, Beverly, Mass., a corporation of Massachusetts No Drawing. Application August 18, 1949, Serial No. 111,071

4 Claims. (Cl. 23—204)

This invention relates to a method for the preparation of diborane ($B_2H_6$). It is based upon the discovery that a reaction between a boron halide, such as boron chloride, boron fluoride, etc., and calcium aluminum hydride takes place in the presence of dioxane as a solvent medium to produce diborane. In a typical procedure, using well known vacuum line techniques, a known amount of a gaseous boron halide, such as boron chloride or boron fluoride, was condensed with liquid nitrogen on a calibrated solution of calcium aluminum hydride in dioxane. The mixture then was warmed to room temperature and allowed to react for a number of hours. Volatile products were removed and fractionated. The yield of diborane was determined by measurement of the amount of gas formed; its identity was established by the vapor pressure (225 mm.) at −112° C. (carbon disulfide bath). If desired, the reaction mixture may be refluxed under nitrogen instead of using the room temperature-vacuum technique. There is no advantage in using a lower temperature since it merely reduces the rate of the reaction. The reaction probably takes place as illustrated by one of the following equations:

(1) $3Ca(AlH_4)_2 + 8BF_3 \rightarrow 3CaF_2 + 6AlF_3 + 4B_2H_6$
(2) $3Ca(AlH_4)_2 + 14BF_3 \rightarrow$
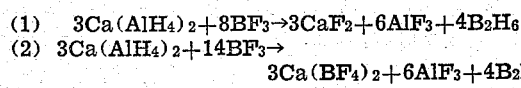
$3Ca(BF_4)_2 + 6AlF_3 + 4B_2H_6$ It is of interest to note that several runs using tetrahydrofuran instead of dioxane resulted in complete failure to generate diborane.

Prior to the present invention calcium aluminum hydride having the formula $Ca(AlH_4)_2$ had been produced experimentally by agitating finely divided calcium hydride suspended in a solution of aluminum chloride in dimethyl ether. This compound is not presently available on the market. In my investigations for generating diborane, the calcium aluminum hydride used was prepared as follows: A clean dry ball mill was loaded with ⅜" steel balls, evacuated and filled with dry nitrogen. High purity (98%) calcium hydride prepared from redistilled calcium, 8.0 grams (0.19 mole), was rapidly transferred into the mill. Once again the mill was evacuated and filled with dry nitrogen. Tetrahydrofuran distilled from lithium aluminum hydride, 100 ml., was added to the mill through the condenser. The hydride was ground in the presence of the solvent for three hours. During the final half hour of grinding, the temperature was raised until the solvent refluxed. A solution of 10.0 grams (0.075 mole) of aluminum chloride dissolved in 100 ml. of tetrahydrofuran was slowly added to the ball mill over a two-hour period. Grinding of the refluxing solution was continued for two hours after the addition was complete. When the reaction mixture was cool, it was filtered and the filtrate analyzed for Cl, H, Ca and Al. In an illustrative analysis, the hydrogen present indicated a yield of 67.5 per cent based on aluminum chloride and the equation:

$$4CaH_2 + 2AlCl_3 \rightarrow Ca(AlH_4)_2 + 3CaCl_2$$

The ratio of Ca:Al:H indicated the formula $Ca_1(Al_{1.06}H_{3.25})_2$.  The chlorine present in the filtrate was 2.2% of that originally introduced as aluminum chloride. Aluminum chloride may be replaced by aluminum bromide.

The tetrahydrofuran solution of the complex hydride was evaporated and finally the solid was heated in vacuo for a short period at 70° C. All the solvent was not removed since an addition compound is formed which cannot be easily split. In the product used in generating diborane, the molar ratio of tetrahydrofuran to calcium aluminum hydride was about 2:1. This product was added to dioxane to make a slurry which consisted essentially of dioxane and calcium aluminum hydride.

It will be understood that the calcium aluminum hydride used may be produced in the presence of other ethers, such as dimethyl ether, tetrahydropyran, etc. Also, it is within the scope of the present invention to produce the required calcium aluminum hydride and the diborane simultaneously or progressively in the same reaction medium, that is, in dioxane containing all the required components for the two reactions, since the temperature requirements for each reaction is substantially the same.

Prior to the present invention, diborane had been produced by reacting a boron halide with either lithium hydride or sodium hydride using diethyl ether as the solvent medium. However, attempts to produce diborane by reacting a boron halide with calcium hydride in any ether solvent medium had not been successful. It is surprising and unexpected, therefore, that the reaction takes place with calcium aluminum hydride in dioxane as the solvent medium, particularly since the reaction does not proceed in tetrahydrofuran as the solvent medium.

In order that those skilled in the art may better understand how the present invention may be carried into effect, the following examples are given by way of illustration and not by way of limitation. In these examples, the vacuum techniques developed by Alfred Stock and his co-workers as described in the article "Hydrides of boron and silicon," Cornell University Press—1933, were employed.

*Example 1*

Calcium aluminum hydride, 0.228 gram (0.00224 mole) combined as an addition compound with tetrahydrofuran in the molar ratio 1:2, was mixed with 8 grams of anhydrous dioxane to form a slurry. This mixture was placed in a 100 ml. flask which was attached to the vacuum line through ground joints. The materials were cooled to liquid nitrogen temperature and 221 c. c. (9.00985 moles) of boron fluoride (gaseous) was condensed into the flask. The reagents were warmed to room temperature and allowed to react for two hours. The volatile products were then removed and fractionated through a trap maintained at minus 80° C. (carbon dioxide-acetone) into a tube held at liquid nitrogen temperature. The diborane purified in this manner was identified by its vapor pressure (225 mm.) at minus 112° C. (carbon bisulfide bath). The amount of boron hydride was 45 c. c. (0.002 mole) corresponding to a yield of 67 per cent based upon the calcium aluminum hydride. The active hydrogen remaining in the reaction flask was determined by hydrolysis with water and acid. It corresponded to 0.058 gram (0.00057 mole) of calcium aluminum hydride or 22.5 per cent of the starting reagent.

*Example 2*

In this run the procedure was identical to that used in Example 1 except that 0.320 gram (0.00314 mole) of the complex hydride of calcium and aluminum and 592 c. c. (0.0264 mole) of boron fluoride were used. The amount of diborane obtained was 68.4 c. c. (0.00305 mole) corresponding to a yield of 73 per cent.

*Example 3*

In this run the procedure was identical to that used in Example 1 except that the boron fluoride was replaced by 343 c. c. (0.0155 mole) of boron chloride and 0.205 gram (0.0020 mole) of the complex hydride of calcium and aluminum was used. The amount of diborane obtained was 30.1 c. c. (0.00134 mole) corresponding to a yield of 50 per cent.

I claim:

1. The method which comprises subjecting a boron halide to the action of a complex hydride of calcium and aluminum in a solvent medium consisting essentially of dioxane, the temperature of the reaction medium being between about room temperature and the refluxing temperature of the liquid present, and removing and recovering gaseous diborane.

2. The method which comprises subjecting a boron chloride to the action of a complex hydride of calcium and aluminum in a solvent medium consisting essentially of dioxane, the temperature of the reaction medium being between about room temperature and the refluxing temperature of the liquid present, and removing and recovering gaseous diborane.

3. The method which comprises subjecting a boron fluoride to the action of a complex hydride of calcium and aluminum in a solvent medium consisting essentially of dioxane, the temperature of the reaction medium being between about room temperature and the refluxing temperature of the liquid present, and removing and recovering gaseous diborane.

4. The method which comprises subjecting a boron halide selected from the group consisting of boron chloride and boron fluoride to the action of a complex hydride of calcium and aluminum in a solvent medium consisting essentially of dioxane, the temperature of the reaction medium being between about room temperature and the refluxing temperature of the liquid present, and removing and recovering gaseous diborane.

ALBERT E. FINHOLT.

REFERENCES CITED

The following references are of record in the file of this patent:

UNITED STATES PATENTS

| Number | Name | Date |
|---|---|---|
| 2,468,260 | Gibb | Apr. 26, 1949 |

OTHER REFERENCES

Hochstein, "Jour. Am. Chem. Soc.," page 305, vol. 71, 1949.

Finholt et al., "Jour. Am. Chem. Soc.," pages 1199–1203, vol. 69, 1947.